Oct. 15, 1963 J. E. PALMER 3,107,055
AGRICULTURAL CROP SPRAYERS
Filed March 6, 1962 3 Sheets-Sheet 1
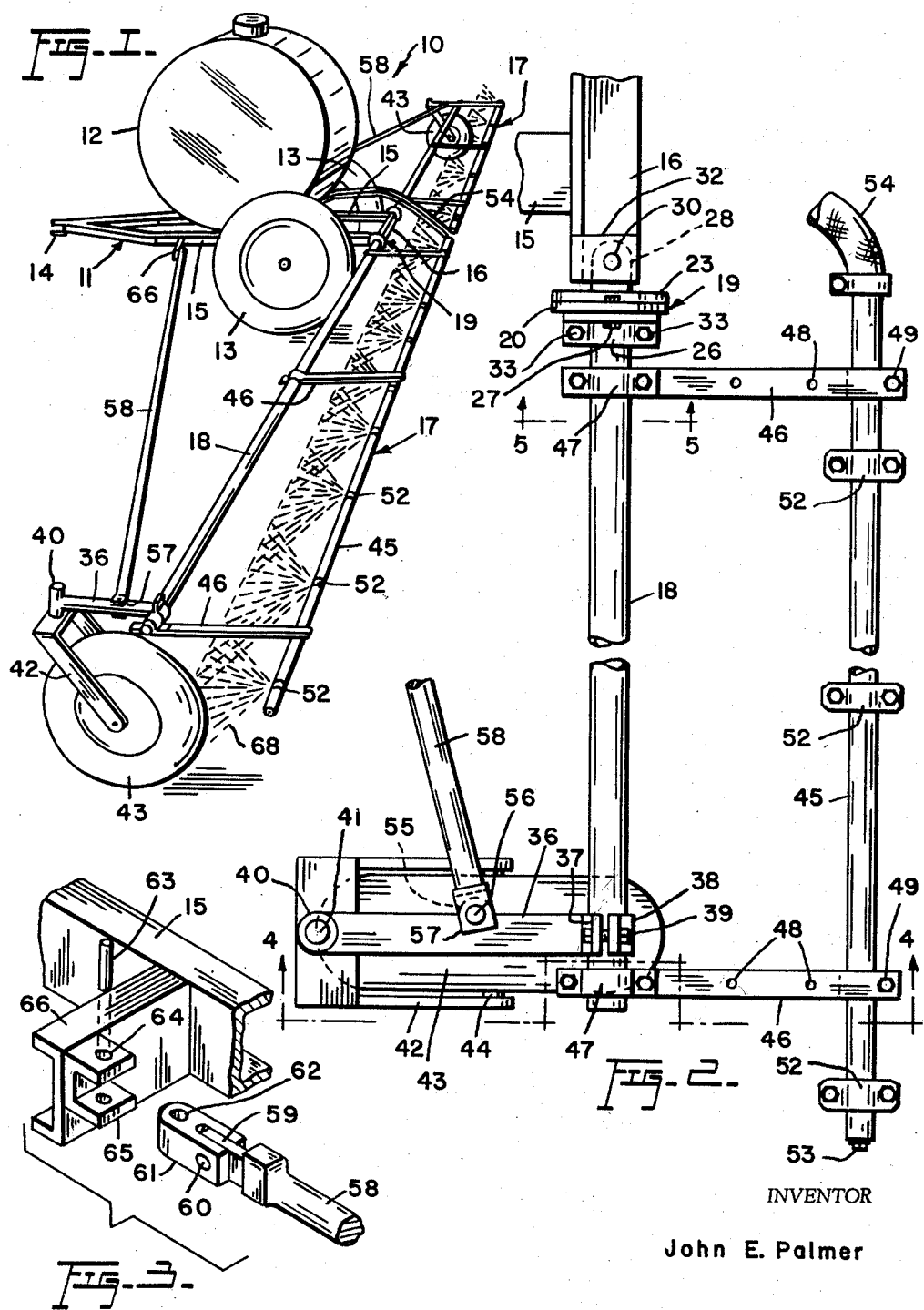
INVENTOR
John E. Palmer Oct. 15, 1963    J. E. PALMER    3,107,055
AGRICULTURAL CROP SPRAYERS
Filed March 6, 1962    3 Sheets-Sheet 2
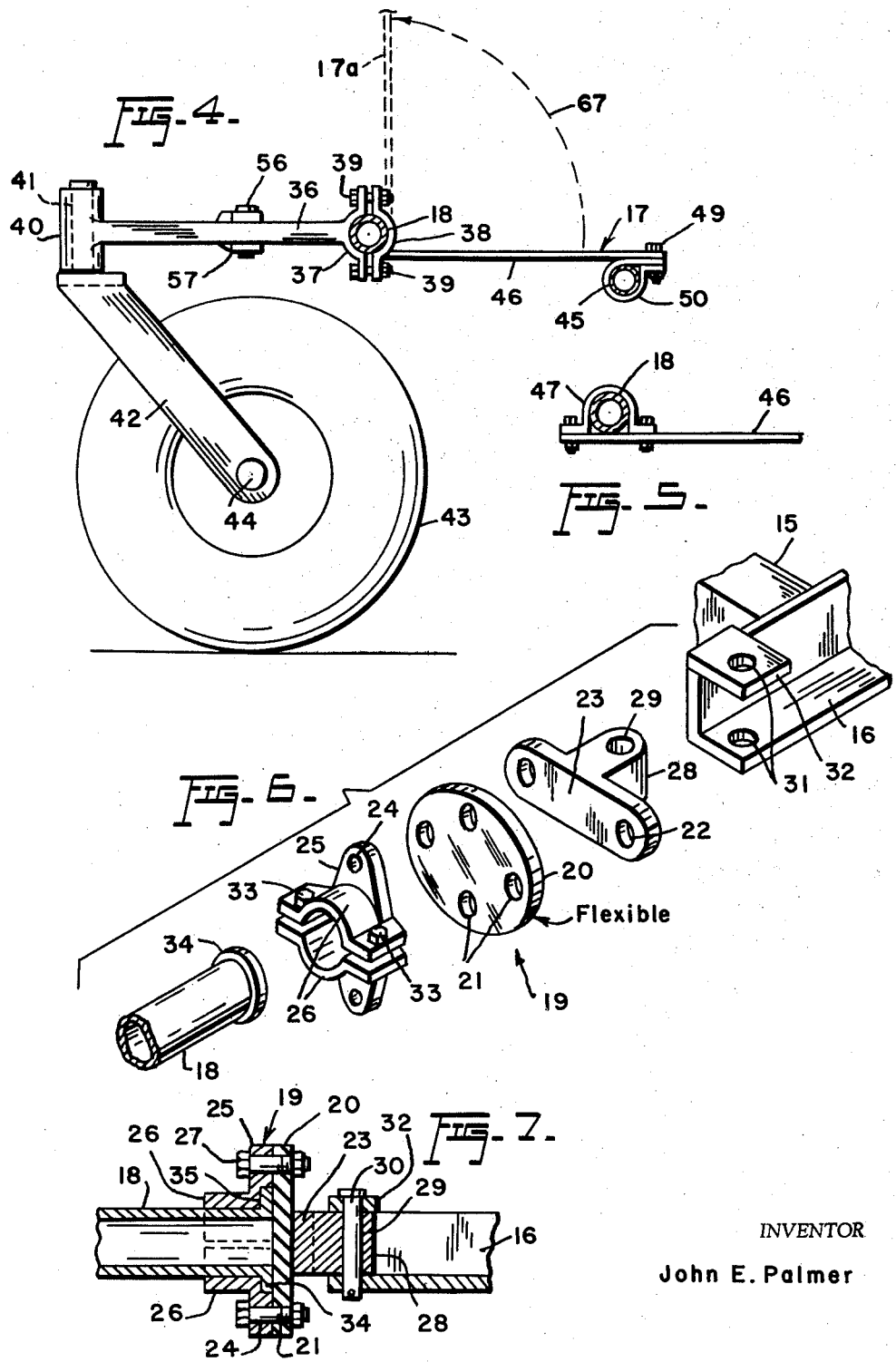
INVENTOR
John E. Palmer Oct. 15, 1963   J. E. PALMER   3,107,055
AGRICULTURAL CROP SPRAYERS
Filed March 6, 1962   3 Sheets-Sheet 3

INVENTOR

John E. Palmer

United States Patent Office 3,107,055
Patented Oct. 15, 1963

3,107,055
AGRICULTURAL CROP SPRAYERS
John E. Palmer, Calgary, Alberta, Canada, assignor, by mesne assignments, to Golden Arrow Manufacturing Limited, Calgary, Alberta, Canada, a Canadian corporation
Filed Mar. 6, 1962, Ser. No. 177,911
8 Claims. (Cl. 239—164)

This invention relates to new and useful improvements in agricultural crop sprayers, and the principal object of the invention is to facilitate accurate application of agricultural chemicals for the control and killing of a wide variety of pests, particularly with regard to the application of systemic type of selective herbicides such as "2–4D" and recently developed chemicals used for the post emergence treatment of wild oats growing in competition with crops.

The benefit available from proper use of selective herbicides is considerable, but the extent of such a benefit depends largely on the accuracy and method of application. This becomes apparent when it is considered that selective herbicides have a damaging influence on crops, which is offset to advantage only by virtue of eliminating competition of the weeds which are less tolerant than the crops to the chemical applied.

Because of the potent nature of selective herbicides, closely screened recommendations for their use have to be followed if best results are to be obtained, it being significant to note that chemical dosages may be as low as two ounces of active chemical ingredient mixed with as little as two or three gallons of water is sufficient for control of highly susceptible weeds in one acre of crop. Under circumstances of such low volume application it is obvious that an evenly distributed application is most desirable, not only from the standpoint of assuring contact of the chemical with the weeds, but also for assuring that the crop is uniformly exposed to a minimum amount of chemical. Since herbicides have a damaging effect on crops, it is apparent that maintaining of even spray patterns becomes more important when higher chemical dosages must be employed for control of weeds which are less susceptible to control at weaker dosages.

Conventional crop sprayers usually consist of a rig carrying a tank for chemicals mixed with water, the rig being equipped with laterally projecting booms having nozzles thereon through which the fluid in the tank is sprayed by pump pressure onto the crop and weeds. The booms, which may be thirty or forty feet long, are attached to the rig in such manner that they are subject to considerable oscillation in both vertical and horizontal directions, and such oscillation of the booms with the spraying nozzles thereon makes uniform spraying patterns virtually impossible. Moreover, when the rig travels over uneven ground, lateral rocking motion of the rig alternately raises and lowers the booms at the opposite sides of the rig and the resultant variations in the distance of the spraying nozzles from the ground produce uneven spraying patterns. In addition, while booms of conventional crop sprayers are vertically adjustable to vary the height of their spraying nozzles above the ground, such adjustment is facilitated by pivoting the booms to the rig so that they are vertically swingable. As a result of this pivotal boom mounting, the spraying nozzles on the booms closer to the pivots are not raised or lowered as much as those on the outer portions of the booms, so that again, a uniform spraying pattern cannot be obtained when the booms are in anything but horizontal positions. Finally, conventional sprayers do not provide any facility for adjusting the direction of spray, for example, from a straight downward direction to a downward and forward direction, such as is highly desirable, for example, in post emergence treatment of wild oats.

As already noted, the accurate application of chemicals which is the principal object of the invention is derived from the provision of an improved crop sprayer which eliminates all of the aforementioned disadvantages of conventional sprayers and assures accurately controlled, uniform spraying, regardless of uneven ground, vertical boom adjustment and direction of spray. Also, the improved sprayer is equipped with means for stabilizing the booms against oscillation, and with facilities for quickly and easily adjusting the height of the booms above the ground as well as the direction of spray.

With the foregoing more important objects and features in view and such other objects and features as may become apparent as this specification proceeds, the invention will be understood from the following description, taken in conjunction with the accompanying drawings, wherein like characters of reference are used to designate like parts, and wherein:

FIGURE 1 is a side perspective view, which shows an improved crop sprayer in accordance with the invention;

FIGURE 2 is an enlarged, fragmentary plan view of one of the booms;

FIGURE 3 is a fragmentary isometric view showing the connection of a boom radius rod to the frame of the rig;

FIGURE 4 is a vertical sectional view, taken substantially in the plane of the line 4—4 in FIGURE 2;

FIGURE 5 is a fragmentary sectional detail, taken substantially in the plane of the line 5—5 in FIGURE 2;

FIGURE 6 is a fragmentary group perspective view of components for connecting the booms to the rig;

FIGURE 7 is a fragmentary vertical sectional detail of the assembled boom to rig connection;

Figure 8:
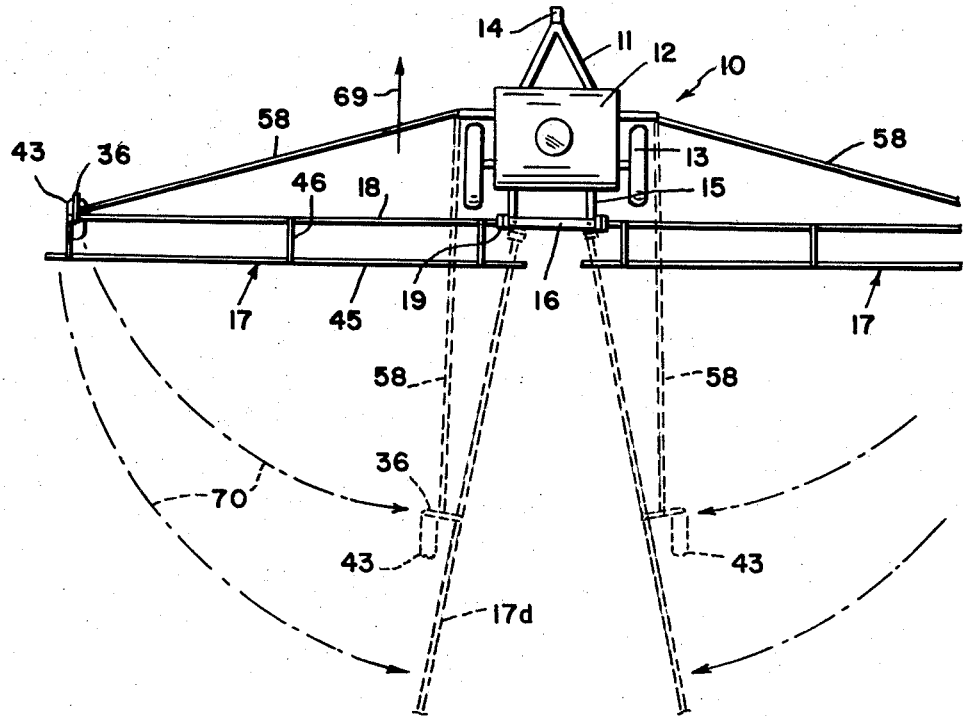
FIGURE 8 is a fragmentary top plan view of the sprayer, showing by dotted lines the booms in their retracted or inoperative positions.

Referring now to the accompanying drawings in detail, FIGURE 1 illustrates the general arrangement of a crop sprayer 10 embodying the invention. The sprayer 10 comprises a chassis or rig 11 on which is mounted a tank 12 containing the chemical fluid to be sprayed. The rig 11 is equipped with travelling wheels 13 and with a hitch 14 for connection to a tractor, and the frame of the rig includes a pair of side members 15 which are connected together at their rear ends by a cross member 16.

A pair of spraying booms, designated generally by the reference numeral 17, are connected to and project laterally to opposite sides from the rig 11, the essence of novelty of the invention residing primarily in the arrangement and mounting of these booms. Since the construction of the two booms is the same, a description of one will suffice for both.

Each boom 17 comprises a boom rail 18 which may be in the form of a round bar or tube and which has an inner end connected by a flexible coupling 19 to the rig cross member 16. The coupling 19 consists of a disc 20 of suitable flexible material provided with four apertures 21 spaced 90° apart, two diametrically opposite of these apertures registering with two apertures 22 formed in the ends of a strap-like coupling member 23, while the other two of the apertures 21 register with apertures 24 formed in projecting ears 25 of a pair of complemental clamps 26 which also constitute a component of the coupling 19. The clamps 26 are disposed at one side of the disc 20 and the member 23 is disposed at the opposite side of the disc, suitable bolts 27 extending through the registering apertures 21, 22 and 21, 24 to hold the parts assembled.

The coupling member 23 is provided with an integral boss 28 having a vertical bore 29 to receive a pivot pin 30 which also passes through aligned apertures 31 provided in the rig cross member 16 and in a bracket 32 secured to the cross member. The two clamps 26 are equipped with a pair of clamping bolts 33, whereby the inner end portion of the boom rail 18 may be secured between the clamps. The inner end of the boom rail is provided with an outturned flange or shoulder 34 which is seated in grooves 35 formed in the ears 25 of the clamps 26, whereby the rail 18 is prevented from sliding outwardly from between the clamps.

The outer end portion of the boom rail 18 has secured thereto a forwardly projecting, horizontal arm 36, the latter being equipped with an integral clamp member 37 and with a complemental clamp member 38 which is secured to the member 37 by suitable clamping bolts 39, so that the arm 36 may be secured to the boom rail 18 by the clamp members 37, 38, as will be clearly understood. The front end of the arm 36 is equipped with a vertical bearing sleeve 40 for the kingpin 41 of a yoke 42, in which a caster 43 is rotatably mounted on an axle 44.

The boom 17 also embodies in its construction a boom tube 45 which is disposed in spaced parallel relation to the rail 18 and is secured thereto by a plurality of straps 46. As shown in FIGURE 5, the straps 46 are provided with clamps 47 for mounting on the rail 18 and they are also provided with spaced apertures 48 to selectively receive bolts 49 of clamps 50 which embrace the tube 45, as illustrated in FIGURE 4. By selectively positioning the bolts 49 in the strap apertures 48, the distance of the boom tube 45 from the boom rail 18 may be adjusted. A plurality of spraying nozzles 52 are provided at longitudinally spaced points on the boom tube 45. These nozzles may be of any suitable construction, as for example, of the type disclosed in my United States Patent No. 3,009,655, dated November 21, 1961, although any suitable conventional nozzles may be used. The outer end of the tube 45 is closed by a plug 53 while the inner end of the tube has a flexible hose 54 connected thereto, through which the fluid to be sprayed is delivered under pressure of a pump (not shown) from the tank 12 into the tube 45 and to the nozzles 52.

The intermediate portion of the aforementioned arm 36 is formed with an apertured boss 55 to which is connected by a suitable pivot pin 56 a yoke 57 provided at the outer end of a radius rod 58. The latter extends obliquely toward the rig 11 and, as is best shown in FIGURE 3, its inner end is formed with an apertured leaf 59 which is connected by a horizontal pivot pin 60 to a pivot block 61. The latter is provided with a vertical bore 62 to receive a pivot pin 63, passing through vertically aligned apertures 64 of a U-shaped bracket 65. The bracket 65 is welded or otherwise secured to an outrigger member 66 which is secured to the frame side member 15 of the rig 11.

With the construction of the invention thus described, its manner of operation will be now explained.

First, it will be readily apparent that the caster wheels 43 with their yokes 42 and arms 36 will effectively support the outer ends of the booms 17 at a uniform height above the ground and that the booms will thereby be prevented from oscillating in a vertical plane, as occurs when they are not ground supported. If the rig 11 should travel over uneven ground, any lateral rocking motion of the rig will be absorbed by the flexible couplings 19, without being transmitted to and effecting the operating height of the booms. Moreover, even if irregular ground contour should require some amount of vertical movement at the outer ends of the booms, such movement will be facilitated by the flexible couplings 19. The radius rods 58 will positively stabilize the booms against movement or oscillation in a horizontal plane, the pivot means 59—65 of the radius rods permitting the same to function effectively even under some vertical movement of the outer ends of the booms, as mentioned above.

Figure 9:
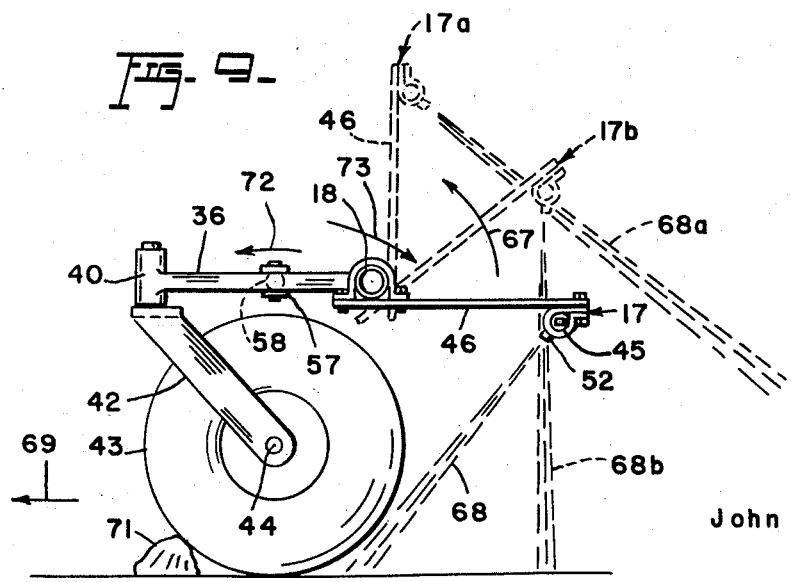
FIGURE 9 is a view, similar to that shown in FIGURE 4 and on a somewhat smaller scale, illustrating by solid and dotted lines various boom positions, directions of spray, and diagrammatically illustrating torsional effects on the boom rail and radius rod.

The height of the boom tubes 45 and spray nozzles 52 above the ground and, incidentally, the direction of spray from the nozzles, may be quickly and easily adjusted by simply loosening the clamp screws 33 and 39, and rotating the boom rails 18 so that the associated straps 46 cause the tubes 45 to be raised or lowered, as is exemplified in FIGURE 9. In other words, with the boom 17 disposed as shown by the full lines and the straps 46 extending horizontally rearwardly from the boom rail 18, the boom may be rotated in the direction of the arrow 67 about the axis of the rail 18 to the position shown by the dotted lines 17a, wherein the straps 46 extend vertically upwardly from the boom rail. Also, the boom may assume an intermediate position 17b at any selected points between the positions 17 and 17a, as will be understood. It is to be particularly noted that adjustment of the boom, that is, setting the boom tubes 45 at different heights above the ground, is effected by simply loosening the clamp screws 33 and 39 and rotating the booms about the axis of the boom rails 18, so that it is not necessary to loosen the individual clamps 47 of the individual straps 46 for purposes of such adjustment. It may be borne in mind that with a boom length of thirty or forty feet, a half dozen or more of the straps 46 may be used on each of the two booms, and the simple boom adjustment as above described eliminates the necessity of individually adjusting a dozen or more of the clamps 47 on the straps 46, as would be required if it were not possible to simply rotate the booms about the axis of the rails 18 after loosening the screws 33, 39. Needless to say, when the booms are adjusted to the required setting, the screws 33, 39 are simply tightened to lock the booms in their adjusted position.

It is to be further noted that when an adjustment of the booms is made, the boom tubes 45 are raised or lowered uniformly along their entire length, so that the spraying nozzles 52 on the tubes 45 are all at the same height above the ground, regardless of the position to which the booms have been adjusted.

The spraying nozzles 52 are secured to the boom tubes 45 so that when the booms are in the position 17 shown by the full lines in FIGURE 9, the spray from the nozzles 52 is directed downwardly and forwardly, as indicated at 68. When the booms are adjusted to the intermediate portion 17b, the nozzle spray is directed substantially downwardly as indicated at 68b, and when the booms are in the raised position 17a, the spray is oriented downwardly and rearwardly as at 68a, all with respect to a forward direction of travel of the sprayer, indicated by the arrow 69.

Apart from the boom adjustment facilitated by the aforementioned rotation of the booms about the axis of the rails 18, an additional adjustment is afforded by placing the bolts 49 of the clamps 50 on the straps 46 in selected apertures 48 of the straps, so as to vary the spacing or radial distance of the boom tubes 45 and nozzles 52 from the boom rails 18, as will be clearly apparent.

When the sprayer is in operation, certain stresses are inherently created in the booms, incident to the travelling movement of the sprayer, particularly over uneven ground. Thus for example, with reference to FIGURE 8, it will be apparent that when the sprayer travels forwardly in the direction of the arrow 69, the booms 17 will have a tendency to swing rearwardly and inwardly (about the pivots 30) as indicated at 70. This tendency will subject the radius rods 58 to tension and the boom rails 18 to axial compression which will be cushioned and absorbed to some extent by the flexible discs 20 of the couplings 19. Moreover, when the booms 17 are in their raised position 17a (see FIGURE 9), and the caster wheels 43 encounter some obstruction 71 on the ground, the weight distribution on the caster wheel axis 44 is such that the radius rods 58 will be subjected to and will counteract torsion in the direction of the arrow 72, so that very little torsional effect is transmitted to the boom rails 18 when the booms are in the 17a position. When the booms 17 are in the full line position shown in FIGURE 9, the leverage effect produced by the tubes 45, straps 46, et cetera, acts about the axis of the rails 18 in the direction of the arrow 73, which substantially counter-balances the torsion effect on the rods 58 in the direction of the arrow 72, so that again, a very small torsional effect is transmitted to the boom rails 18 themselves. In any event, whatever small torsional effects may be placed on the boom rails 18 will be cushioned and absorbed by the flexible discs 20 of the couplings 19.

It will be apparent from the foregoing that the flexible couplings 19, in addition to facilitating raising and lowering of the booms 17 when the rig travels over uneven ground, also act as shock absorbers and dampeners for axial compression and torsional forces affecting the boom rails 18. Similarly, it will be apparent that the radius rods 58, apart from stabilizing the booms against horizontal oscillation, also serve as torsion bars or rods for equalizing torsional effects, so that only a very small, if any, torsional stress is permitted to reach the boom rails 18.

When it is desired to transport the sprayer from one site of operation to another, the clamp screws 33, 39 are loosened and the booms are raised from the position 17 to the position 17a (see FIGURE 9), whereupon the booms are swung rearwardly and inwardly as indicated by the arrows 70 in FIGURE 8, so that they assume a trailing position behind the rig 11, as indicated at 17d. This rearward swinging of the booms, of course, takes place about the pivots 30 on the cross member 16 of the rig, and as the booms are swung rearwardly, the clamp members 37, 38, loosened by the bolts 39, will slide longitudinally inwardly along the boom rails 18, along with the caster wheels 43, while the radius rods 58 are folded alongside the wheels 13 of the rig, as is clearly illustrated in FIGURE 8. The clamp bolts 33, 39 may then be tightened to lock the booms in the retracted, trailing position and it is to be observed that since the booms are raised to the 17a position, they will not interfere with each other when they are retracted to the 17d position, such as would occur if the boom straps 46 were left horizontally disposed during retraction of the booms. As already pointed out, adjustment of the booms from the position 17 to the position 17a may be quickly and easily made by rotating the booms about the axis of the rails 18, so that it is not necessary to individually adjust the clamps 47 on the straps 46, every time it is desired to retract or project the booms.

While in the foregoing there has been described and shown the preferred embodiment of the invention, various modifications may become apparent to those skilled in the art to which the invention relates. Accordingly, it is not desired to limit the invention to this disclosure, and various modifications and equivalents may be resorted to, falling within the spirit and scope of the appended claims.

What is claimed as new is:

1. In an agricultural crop sprayer, the combination of a wheeled frame, a pair of booms projecting laterally to opposite sides of said frame, each of said booms including a horizontal boom rail and a spray nozzle-equipped tube connected in spaced parallel relation to said boom rail, flexible coupling means connecting the inner ends of said rails of said booms to said frame for movement of the booms in vertical and horizontal planes, a pair of casters provided at the outer ends of said booms, adjustable means securing said casters to said boom rails of the booms, and radius rods extending from said frame to said casters, said adjustable caster securing means and said coupling means being adjustable to permit rotation of said boom rails about the axis thereof, whereby to vary the height of said nozzle-equipped tubes above the ground with all portions of each nozzle-equipped tube being at the same elevation in any given position of adjustment.

2. The device as defined in claim 1 together with means for varying the spacing of said nozzle-equipped tubes from said boom rails.

3. In an agricultural crop sprayer, the combination of a wheeled frame, a boom projecting laterally to one side of said frame, said boom including a horizontal boom rail, a spray nozzle-equipped tube disposed in spaced parallel relation to said rail, and means connecting said tube to the rail, a flexible coupling connecting the inner end of said rail to said frame for movement of the rail in vertical and horizontal directions, an arm connected to the outer end of said boom rail, a caster wheel supporting said arm, said coupling and said arm including clamp means embracing said boom rail whereby upon loosening of the clamp means the boom rail may be rotated about its axis to vary the height of said nozzle-equipped tube above the ground with all portions of the nozzle-equipped tube being at the same elevation in any given position of adjustment, and a radius rod movably connected to said arm and to said frame.

4. The device as defined in claim 3 wherein said clamp means of said arm are adjustable longitudinally inwardly on said boom rail to permit rearward and inward swinging of said boom about said coupling to an inoperative position behind said frame while retaining said radius rod of a fixed length and connected to said arm.

5. The device as defined in claim 3 wherein said means connecting said tube to said rail include means for adjusting the spacing of the tube from the rail.

6. The device as defined in claim 3 wherein said means connecting said tube to said rail comprise a set of straps extending at mutually spaced points between said tube and said rail, clamps provided on said straps and securing the same to the rail, said straps being provided with longitudinally spaced apertures, and clamps embracing said tube and having clamp bolts received selectively in the apertures of said straps, whereby to vary the spacing of said tube from said rail.

7. In an agricultural crop sprayer, the combination of a wheeled frame, a boom projecting laterally to one side of said frame, said boom including a horizontal boom rail and a spray nozzle-equipped tube connected in spaced parallel relation to said boom rail, flexible coupling means connecting the inner end of said rail of said boom to said frame for movement of the boom in vertical and horizontal planes, a caster provided at the outer end of said form, adjustable means securing said caster to said rail of the boom, and a radius rod extending from said frame to said caster, said adjustable caster securing means and said coupling means being adjustable to permit rotation of said boom rail about the axis thereof, whereby to vary the height of said nozzle-equipped tube above the ground with all portions of the nozzle-equipped tube being at the same elevation in any given position of adjustment.

8. The device as defined in claim 7 together with means for varying the spacing of said nozzle-equipped tube from said boom rail.

References Cited in the file of this patent

UNITED STATES PATENTS

| | | |
|---|---|---|
| 869,958 | Bateman et al. | Nov. 5, 1907 |
| 912,966 | Lamiell et al. | Feb. 16, 1909 |
| 1,971,262 | Hendricks | Aug. 21, 1934 |
| 2,575,521 | Ireland | Nov. 20, 1951 |
| 2,657,949 | Morrison | Nov. 3, 1953 |
| 2,793,909 | Gerbracht | May 20, 1957 |
| 3,023,970 | Knoell | Mar. 6, 1962 |

FOREIGN PATENTS

| | | |
|---|---|---|
| 745,836 | France | Feb. 27, 1933 |